United States Patent
Thanh et al.

(10) Patent No.: US 7,683,947 B2
(45) Date of Patent: Mar. 23, 2010

(54) BI-POLAR SIGNALING SCHEME FOR IMAGING SYSTEM

(75) Inventors: Chuc Thanh, Davis, CA (US); Robert Glenn, Bend, OR (US); David W. Cline, Elk Grove, CA (US)

(73) Assignee: Intel Corporation, Santa Clara, CA (US)

( * ) Notice: Subject to any disclaimer, the term of this patent is extended or adjusted under 35 U.S.C. 154(b) by 457 days.

(21) Appl. No.: 11/701,321

(22) Filed: Jan. 31, 2007

(65) Prior Publication Data

US 2008/0180546 A1 Jul. 31, 2008

(51) Int. Cl.
*H04N 9/64* (2006.01)

(52) U.S. Cl. .................................. 348/243; 348/241

(58) Field of Classification Search ......... 348/294–324, 348/243, 241, 250, 245, 247, 264; 358/482, 358/483, 443–446, 518, 519; 330/250, 252, 330/254, 261
See application file for complete search history.

(56) References Cited

U.S. PATENT DOCUMENTS

| | | | | |
|---|---|---|---|---|
| 4,805,011 A | * | 2/1989 | Sase | 348/237 |
| 5,329,312 A | * | 7/1994 | Boisvert et al. | 348/256 |
| 5,757,440 A | * | 5/1998 | Mangelsdorf | 340/573.4 |
| 6,774,941 B1 | * | 8/2004 | Boisvert et al. | 348/241 |
| 7,489,883 B2 | * | 2/2009 | Rossi et al. | 399/44 |
| 2004/0032626 A1 | * | 2/2004 | Rossi | 358/504 |
| 2005/0195448 A1 | * | 9/2005 | Llewellyn et al. | 358/446 |

OTHER PUBLICATIONS

Yoshihisa Fujimoto et al., A Switched-Capacitor Variable Gain Amplifier for CCD Image Sensor Interface System, ESSCIRC 2002, pp. 363-366.

* cited by examiner

*Primary Examiner*—Tuan Ho
*Assistant Examiner*—Don Nguyen
(74) *Attorney, Agent, or Firm*—Trop, Pruner & Hu, P.C.

(57) ABSTRACT

An apparatus for providing amplified image data may include an image sensor including a number of pixel light sensing elements. Circuitry may output pixel exposure signals and a dark level signal. The differences between the pixel exposure signals and the dark level signal are uni-polar signals. A variable gain amplifier may shift the uni-polar signals to bipolar signals centered around zero, and may also amplify the bipolar signals. In this manner, a full scale output range of the variable gain amplifier may be substantially utilized.

9 Claims, 3 Drawing Sheets

US 7,683,947 B2

BI-POLAR SIGNALING SCHEME FOR IMAGING SYSTEM

BACKGROUND

Implementations of the claimed invention generally may relate to schemes for amplifying captured image data and, more particularly, to such schemes that involve amplification via a variable gain amplifier.

Image sensors are becoming increasingly prevalent in modern electronics. Such sensors typically convert received photons to electrical signals, and may be found in such devices as computers, personal digital assistants (PDAs), phones, and other electronic devices. The image data from the sensor itself, which is typically in the form of an analog voltage, may be converted into digital data by circuitry for later processing by the device in which the sensor resides.

Various schemes may be used to convert such analog image data into digital data, and some of these schemes may involve variable gain amplifiers (VGAs).

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
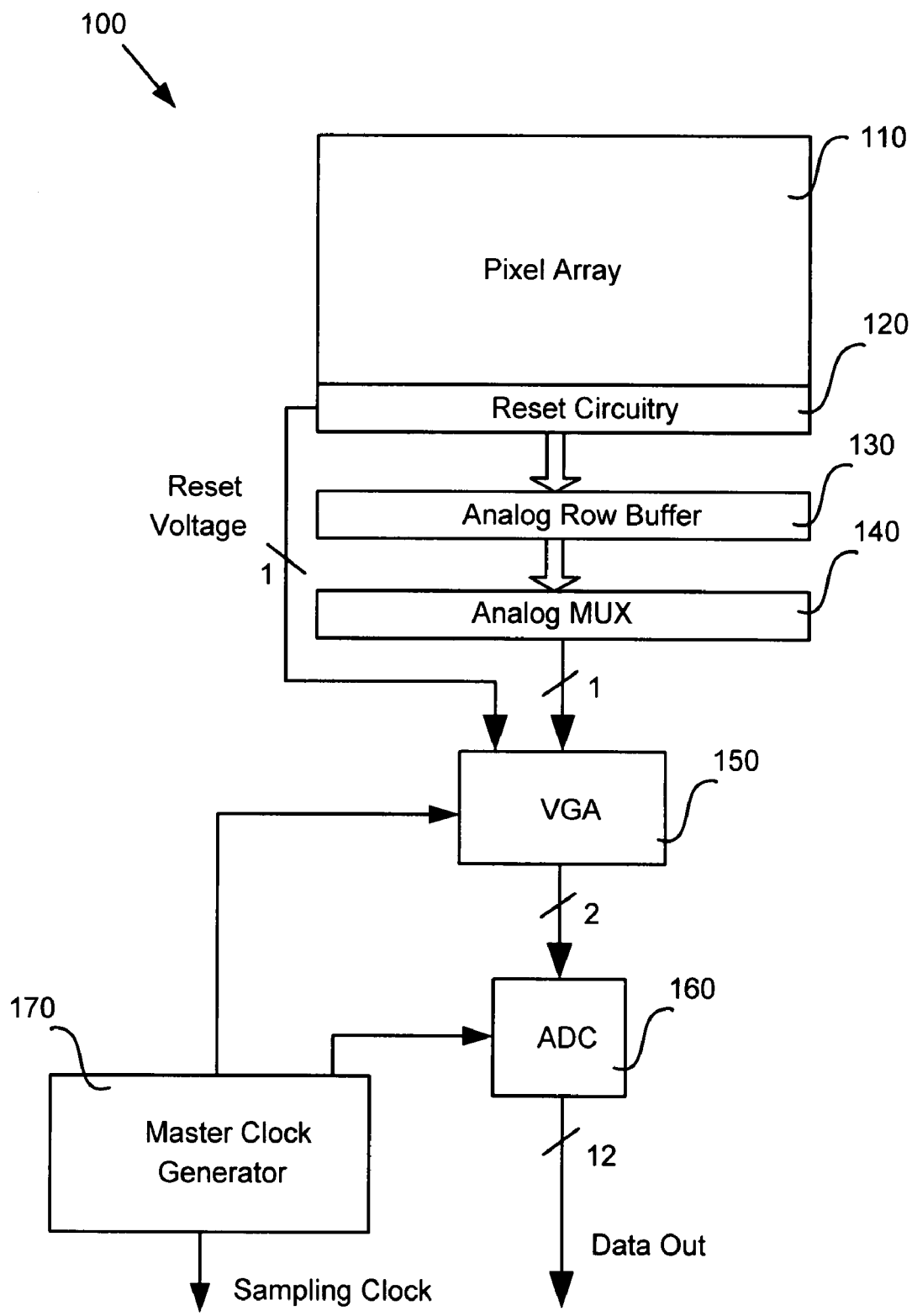
FIG. 1 illustrates a front end of an image sensing system.

FIG. 1 illustrates a front end of an image sensing system 100. System 100 may include a pixel array 110, a reset circuitry 120, an analog row buffer 130, an analog multiplexer (MUX) 140, a variable gain amplifier (VGA) 150, an analog-to-digital converter (ADC) 160, and a master clock generator 170. Other portions of system 100, such as those that use the data out and sampling clock outputs, are not shown for ease of explanation. One aim of system 100 is to capture, evaluate, and preserve scene image information to be redisplayed with an image quality as close to the natural perception of the original scene as possible.

Pixel array 110 may include an array of light sensing element, such as charge coupled devices. These individual sensors may output a voltage in proportion to the amount of incident light. The signals output from pixel array 110 may have a voltage range from a dark value to some positive value corresponding to a maximum or saturated. In some implementations, the voltage may decrease from the dark value to the full scale value, although in other implementations, the sensors may be designed so that the output voltage increases from the dark value to the full scale value.

Reset circuitry 120 may be arranged to output a row of data in parallel with a positive signal range. In doing so, circuitry 120 may periodically reset the sensors in array 110 to a dark (or zero exposure) level, known as a "reset voltage." In some implementations, the signal values of individual columns (e.g., the positive signal range referred to above) may take on a positive voltage less than, or equal to, this reset voltage. Reset circuitry 120 may also output this reset voltage that is associated with all column values in an output row of data from array 110. In some implementations, reset circuitry 120 may be arranged to perform a "tapered reset" scheme, although the invention described herein is not limited to such a scheme.

Figure 2A:
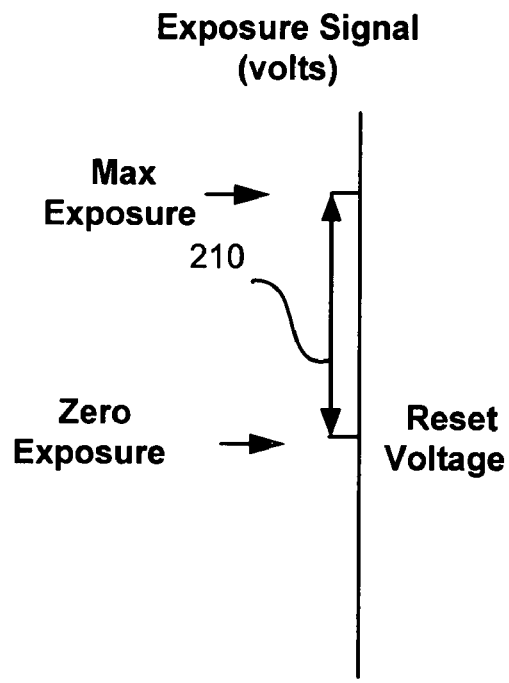
FIG. 2A conceptually illustrates a unipolar signal output.

FIG. 2A illustrates a uni-polar signal range 210, ranging from the reset voltage level to some maximum exposure value (e.g., a "uni-polar" range, because it includes positive values only). This positive range 210 may be representative of the range of voltages output by reset circuitry 120 and input to analog row buffer 130. In FIG. 2A, the "max exposure" illustrates the voltage corresponding to the maximum per-pixel exposure output of array 110. Although FIG. 2A illustrates a range decreasing from the reset voltage, in some implementations, the range may increase from the reset voltage, depending on the design of array 110 and/or circuitry 120.

Returning to FIG. 1, analog row buffer 130 may be arranged to temporarily store a number of analog voltages in parallel from reset circuitry 120. When analog MUX 140 has finished processing the previous row of analog data, the current row of uni-polar signals may be read out of buffer 130 and processed by MUX 140.

MUX 140 may include passive circuitry such as a number of switches arranged to serialize the row of data from buffer 130. Thus, MUX 140 may output analog column values within a row one at a time to VGA 150. Because of the possible passive arrangement of MUX 140, the voltages that it outputs may be uni-polar (e.g., within range 210 in FIG. 2A) up to the reset level.

VGA 150 may include a differential input, variable gain amplifier. VGA 150 may be arranged to shift the common mode of the analog voltages that are input from MUX 140 based on an internally-generated bias voltage. VGA 150 may also be arranged to multiply the common mode-shifted voltage a variable amount (e.g., about two in one implementation, but the gain may vary in accordance with a sensitivity setting of system 100). Such shifting and multiplication may enable the full scale operation of VGA 150, as opposed to merely amplifying a uni-polar signal that uses half, or less, of VGA 150's full dynamic output range (e.g., spanning from a positive full scale value to a negative full scale value). Such signal shifting and multiplication by, in one example, about two times (e.g., 2×), may effectively increase the signal-to-noise-plus-distortion ratio (SNDR) of VGA 150 (and consequently system 100) by about 6 dB relative to the uni-polar case.

Figure 2B:
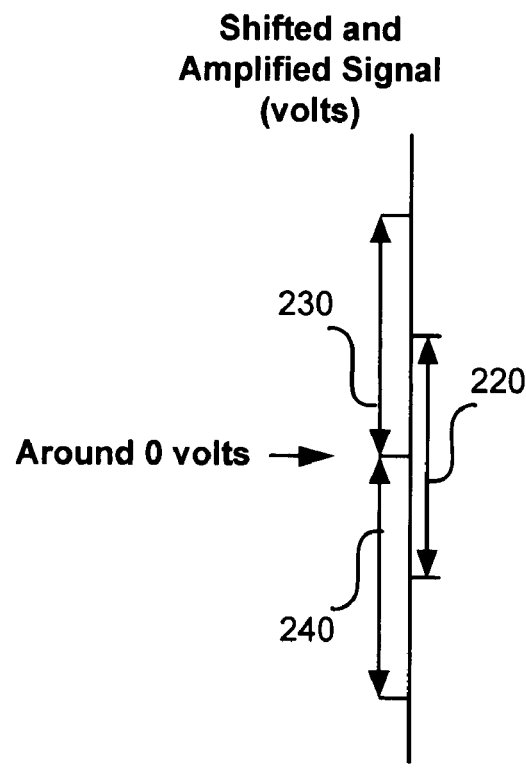
FIG. 2B conceptually illustrates a bipolar signaling scheme used in the system of FIG. 1.

FIG. 2B conceptually illustrates a bipolar signaling scheme used by VGA 150. Voltage range 220 has been shifted, for example in accordance with a bias voltage generated within VGA 150, to be bi-polar around approximately zero volts (or whatever voltage is in the middle of the full scale output range of VGA 150). Conceptually, range 220 may be amplified to produce the combination of ranges 230 and 240. Range 230 illustrates the amplified portion of range 220 that is less than the mid-range voltage. Range 240 illustrates the amplified portion of range 220 that is greater than the mid-range voltage.

Returning to FIG. 1, it should be noted that VGA 150, as depicted, should not draw charge from MUX 140. As previously explained, MUX 140 itself may be a passive device made up of device switches. Any charge drawn from the MUX 140, then, would be supplied by the row buffer 130. Row buffer 130 is typically designed to be low power, and should not be required to supply large transient or DC currents. Also in VGA 150, a design trade-off should be made among how much load capacitance it can impose on row buffer 130, how much power is incurred by VGA 150 to get large gain with small input devices, and how large of an offset can be tolerated from VGA 150. Further, VGA 150 should also be able to handle a relatively large common mode input range (e.g., equal to half the input signal range) without causing a significant change in its output common mode voltage.

Figure 3:
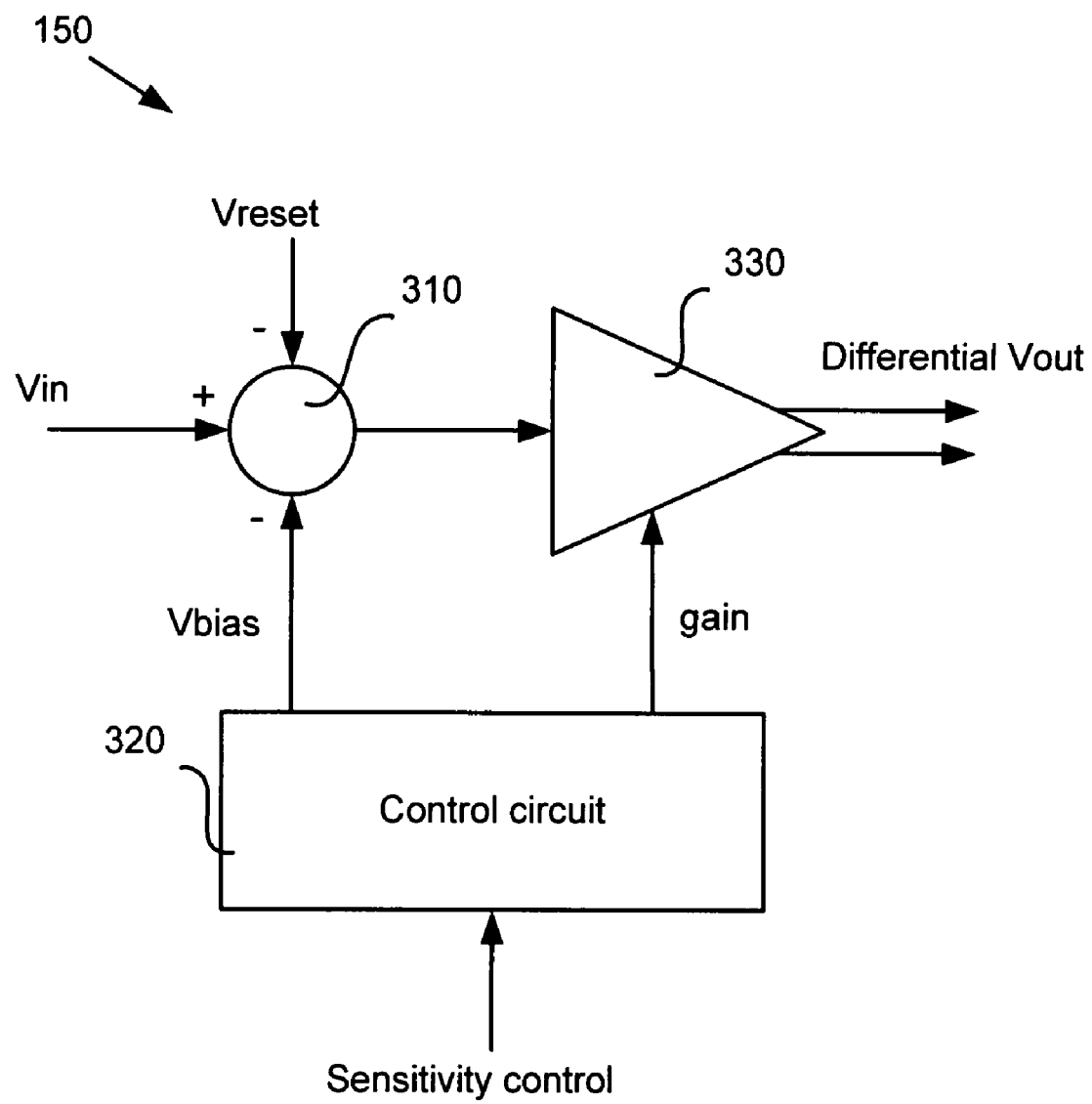
FIG. 3 illustrates an exemplary implementation of a variable gain amplifier.

FIG. 3 illustrates an exemplary implementation of one stage of VGA 150. Other, prior and/or subsequent, stages of VGA 150 are not shown for clarity of explanation. In some implementations, VGA 150 may include a combiner 310, a control circuit 320, and a differential amplifier 330.

Combiner 310 may receive at one input the difference between the voltage from MUX 140 (e.g., $V_{IN}$) and the reset voltage $V_{RESET}$. This difference may be produced by an earlier stage of VGA 150, and may represent an actual exposure of a sensor in array 110, relative to the dark or reset voltage. Combiner 310 may receive a bias voltage $V_{BIAS}$ from control circuit 320. Combiner 310 may subtract the bias voltage from its other input to output a bipolar voltage that is centered about a mid-range value (e.g., zero volts). With reference to FIG. 2B, the range of voltages output by combiner 310 may be conceptualized as bipolar range 220.

Control circuit 320 may receive a sensitivity control input that is related to one of a number of possible sensitivity and/or International Organization for Standardization (ISO) settings and/or white balance values for system 100 and may output a corresponding bias voltage $V_{BIAS}$ and gain value. Such sensitivity levels are known, and may relate, for example, to an amount of incident light on array 110 or other performance characteristics of system 100. If the sensitivity control input is relatively low (indicating a relatively small input voltage $V_{IN}$), for example, the gain value output by circuit 320 may be relatively large to cause amplification by a relatively large amount, and the bias voltage $V_{BIAS}$ output by circuit 320 may be relatively small to shift the small input values by a relatively small amount. Conversely, if the sensitivity control input is relatively high (indicating a relatively large input voltage $V_{IN}$), for example, the gain value output by circuit 320 may be relatively small to cause amplification by a relatively small amount, and the bias voltage $V_{BIAS}$ output by circuit 320 may be relatively large to shift the large input values by a relatively large amount to center the range around the mid-range value.

Differential amplifier 330 may receive the bipolar-ranged output of combiner 310 and may amplify this value according to the gain value from control circuit 320. Amplifier 330 may be implemented in accordance with a number of known variable-gain designs, such as a resistor-based configuration, a switched-capacitor design, etc. With reference to FIG. 2B, differential amplifier 330 may amplify values in range 220 to values in a full scale range 230 or 240 based on the (variable) gain value. In this way, VGA 150 shifts the input voltage from MUX 140 to a different value that allows maximal (e.g., full scale) signal swing from VGA 150's output $V_{OUT}$. Such common mode level shifting and, for example, a 2× signal multiplication, may provide, in this example, a 6 dB SNDR performance increase at VGA 150.

Returning to FIG. 1, analog-to-digital converter (ADC) 160 may convert the differential analog output signal from VGA 150 into a corresponding digital representation. In some implementations, ADC 160 may produce a 12-bit digital output, although other numbers of significant digits are possible.

Master clock generator 170 may control transfer of data from VGA 150 and ADC 160. Although not explicitly shown, the circuitry in VGA 150 that receives a clock signal from generator 170 may be in a subsequent stage to that shown in FIG. 3. In some implementations, the clock signals input to VGA 150 and ADC 160 may be non-overlapping.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although the above scheme has been described for a reset-type image sensor, but it may also be applicable to other types of image sensors. For example, for a "hard reset" scheme, a differential offset would be added to the delta-double sample and exposure signal in such a scheme. The level shifting and amplification described herein may be used to fully utilize the dynamic range in VGAs within various image sensing systems and other data-driven systems that would otherwise produce a uni-polar output.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. An apparatus for providing amplified image data, comprising:
   an image sensor including a number of pixel light sensing elements;
   circuitry to output pixel exposure signals and a dark level signal, where differences between the pixel exposure signals and the dark level signal are uni-polar signals;
   a variable gain amplifier to shift the uni-polar signals to bipolar signals centered around zero, and to amplify the bipolar signals so that a full scale output range of the variable gain amplifier is substantially utilized, wherein the variable gain amplifier includes a combiner, a differential amplifier, and control circuitry to supply a bias signal to said combiner to shift the uni-polar signals and a gain signal to said differential amplifier to amplify the bipolar signals based on a sensitivity control signal.

2. The apparatus of claim 1, wherein the circuitry includes: reset circuitry, and
   wherein the dark level signal includes a reset signal.

3. The apparatus of claim 1, further comprising:
   an analog multiplexer to serialize pixel exposure signals into a serial stream of pixel exposure signals.

4. The apparatus of claim 3, further comprising:
   an analog buffer between the circuitry and the analog multiplexer to temporarily store the pixel exposure signals.

5. The apparatus of claim 1, said combiner coupled to the control circuitry to arithmetically combine the bias signal and the uni-polar signals.

6. The apparatus of claim 1, further comprising:
a differential input, analog to digital converter to convert the bipolar signals from the variable gain amplifier into digital values.

7. An apparatus for providing amplified image data, comprising:
a line of image sensors to convert incident light to electrical signals;
reset circuitry to output a group of positive analog signals from the line of image sensors and to output a reset voltage corresponding to the group of positive signals;
an amplifier including:
a combiner to combine a difference between the group of positive signals and the reset voltage with a bias signal to produce shifted signals,
a differential amplifier to amplify the shifted signals based on a gain signal to produce amplified output signals, and
control circuitry to supply the bias signal to said combiner and the gain signal to said differential amplifier.

8. The apparatus of claim 7, further comprising: a differential analog to digital converter to convert the amplified output voltages into digital values.

9. The apparatus of claim 7, wherein the amplifier further includes:
a section to generate the difference between the group of positive signals and the reset voltage.

* * * * *